(12) United States Patent
Karlinsky et al.

(10) Patent No.: US 9,904,995 B2
(45) Date of Patent: Feb. 27, 2018

(54) SYSTEM AND METHOD FOR PATCH BASED INSPECTION

(71) Applicant: Applied Materials Israel Ltd., Rehovot (IL)

(72) Inventors: Leonid Karlinsky, Rehovot (IL); Moshe Rosenweig, Rehovot (IL); Boaz Cohen, Lehavim (IL)

(73) Assignee: APPLIED MATERIALS ISRAEL, LTD., Rehovot (IL)

(*) Notice: Subject to any disclaimer, the term of this patent is extended or adjusted under 35 U.S.C. 154(b) by 137 days.

(21) Appl. No.: 14/964,527

(22) Filed: Dec. 9, 2015

(65) Prior Publication Data
US 2017/0169554 A1 Jun. 15, 2017

(51) Int. Cl.
*G06K 9/00* (2006.01)
*G06T 7/00* (2017.01)
*G06T 5/00* (2006.01)
*G06K 9/62* (2006.01)

(52) U.S. Cl.
CPC .............. *G06T 7/001* (2013.01); *G06K 9/621* (2013.01); *G06T 5/002* (2013.01); *G06T 7/0081* (2013.01); *G06K 2209/19* (2013.01); *G06T 2207/30148* (2013.01)

(58) Field of Classification Search
CPC . G06T 2207/30148; G06T 2207/30168; G06T 7/0002; G06T 7/0008; G06K 15/107
See application file for complete search history.

(56) References Cited

U.S. PATENT DOCUMENTS

| 9,430,824 B2* | 8/2016 | Sezginer | |
|---|---|---|---|
| 2011/0194752 A1* | 8/2011 | Pang | G03F 1/84 382/149 |
| 2013/0336573 A1 | 12/2013 | Dalla-Torre et al. | |
| 2014/0341462 A1 | 11/2014 | Sezginer et al. | |

* cited by examiner

*Primary Examiner* — Eueng-Nan Yeh
(74) *Attorney, Agent, or Firm* — Lowenstein Sandler LLP

(57) ABSTRACT

An inspection system that may include a processor and a memory module; wherein the memory module is configured to store a first image of an area of an object and a second image of the area of the object; wherein the processor is configured to generate a synthetic image of the area of the object, and to compare the synthetic image to the second image to provide defect detection results.

14 Claims, 12 Drawing Sheets

SYSTEM AND METHOD FOR PATCH BASED INSPECTION

BACKGROUND

During the fabrication of semiconductor devices, defects are inspected on objects such as wafers and lithographic masks by acquiring images of objects' surfaces and comparing those images to references.

The references may constitute model images, measured images acquired at previous inspection cycles, images simulated based on design data. Several comparison techniques are known, such as die-to-die (D2D), cell-to-cell (C2C), die-to-model (D2M). US Patent Application No. 20130336573 discloses defect detection including patch-to-patch comparisons, and is incorporated herein in its entirety. US Patent Application No. 20140341462 discloses machine learning method and apparatus for inspecting reticles, and is incorporated herein in its entirety.

Lithographic masks are exposed during a lithographic process to radiation thereby forming patterns on a wafer. A lithographic mask error may result in a large number of defective wafers. Therefore—there is a need to rigorously inspect lithographic masks.

A multi-die lithographic mask can be evaluated using die-to-die or cell-to-cell comparison. Such a comparison cannot be applied to a single die lithographic mask.

There is a growing need to provide a system and method for evaluating objects such as, but not limited to, lithographic masks and especially single die lithographic masks.

There is a growing need to improve inspection capabilities by providing systems and methods for evaluating objects such as but not limited to wafers and lithographic masks inspected using several imaging modalities.

SUMMARY

According to an embodiment of the disclosure there may be provided an inspection system that may include a processor and a memory module; wherein the memory module may be configured to store a first image of an area of an object and a second image of the area of the object; and wherein the processor may be configured to generate a synthetic image of the area of the object, and to compare the synthetic image to the second image to provide defect detection results.

The processor may be configured to generate the synthetic image of the area of the object by repeating, for each first patch out of a group of first patches that belong to the first image, the operations of (i) searching for relevant reference patches, wherein each relevant reference patch has a reference patch signature that is similar to a first patch signature of the first patch; and (ii) when detecting the relevant reference patches then processing the relevant reference patches to provide a synthetic patch of the synthetic image.

According to an embodiment of the disclosure there may be provided a method for inspecting an area of an object, the method may include generating, by a processor, a synthetic image of the area of the object; and comparing the synthetic image to a second image to provide defect detection results.

The generating of the synthetic image of the area of the object may include repeating, for each first patch out of a group of first patches that belong to a first image, the operations of (i) searching for relevant reference patches, wherein each relevant reference patch has a reference patch signature that is similar to a first patch signature of the first patch; and (ii) when detecting the relevant reference patches then processing the relevant reference patches to provide a synthetic patch of the synthetic image.

Each relevant reference patch may have a reference patch signature that is similar to a first patch signature of the first patch; and (ii) when detecting the relevant reference patches then processing the relevant reference patches to provide a synthetic patch of the synthetic image.

The method may include positioning the synthetic patch at a synthetic patch location that corresponds to a first patch location.

The method may include applying a smoothing function on partially overlapping synthetic patches.

The method may include receiving or generating information about regions of interest within the area of the object; and wherein the group includes only first patches that are at least partially included within a region of interest.

The object may be lithographic mask and the regions of interest may correspond to a printability of regions of the lithographic mask.

The generating of the synthetic patch may include calculating a weighted sum of the relevant reference patches.

The first patch signature may include information about intensities of pixels of the first patch and information about intensities of pixels of a second image region; and wherein the second image region is located, within the second image, at a second image region location that that is proximate to a second image location that corresponds to a first patch location.

The second image region surrounds second image pixels that are located, in the second image, at the second image location that corresponds to the first patch location.

The method may include determining a similarity between the first patch signature and the reference patch signature based on a distance between the first patch signature and the reference patch signature.

The first patch signature further may include spatial relationship information about a spatial relationship between the first patch and an anchor.

The first patch signature further may include spatial relationship information about a spatial relationship between the first patch and an anchor that is closer to the first patch than any other anchor of the first image.

The method may include building a K-D tree of signatures of reference patches and wherein the searching for the relevant reference patches may include scanning the K-D tree.

The reference patches correspond to first image pixels that may include at least a majority of first image pixels.

The method may include calculating a first hash value of the first patch; calculating reference hash values of the reference patches; and searching for at least one reference patch hash value that matches the first hash value.

The method may include calculating the first hash value by applying a distance conserving hash function.

The method may include searching for at least one of the first patches of the group a proximate first patch that is associated with similar reference patch.

Each first patch may be associated with a pixel of the first image; and wherein the group of first patches may include first patches associated with a majority of first image pixels.

The group of first patches may include first patches associated with suspected defects.

The method may include searching for the relevant reference patches out of a second group of first patches that cover at least a majority of the first image.

The method may include storing the signature of the first patch when failing to detect the relevant reference patches;

and comparing the first patch signature to patch signatures detected during an inspection of other areas of the object.

The searching for relevant reference patches may include applying a first search process of a first accuracy and a first resource consumption; determining whether the searching for relevant reference patches ended; when the searching for the relevant reference patches did not end then applying a second search process of a second accuracy and a second resource consumption; and wherein the second accuracy is finer than the first accuracy and when the second resource consumption exceeds the first resource consumption.

The relevant reference patches may belong to the first image.

The group of first patches may include all the first patches of the first image.

The method may include running a comparison for all patches of the first image with all reference patches by assigning a similarity value for each pair of first patch and reference patch and selecting similar pairs of first patches and reference patches.

According to an embodiment of the disclosure there may be provided a non-transitory computer readable medium that stores instructions that once executed by a computer cause the computer to generate a synthetic image of an area of an object; and compare the synthetic image to a second image to provide defect detection results.

The generating of the synthetic image of the area of the object may include repeating, for each first patch out of a group of first patches that belong to a first image, the operations of (i) searching for relevant reference patches, wherein each relevant reference patch has a reference patch signature that is similar to a first patch signature of the first patch; and (ii) when detecting the relevant reference patches then processing the relevant reference patches to provide a synthetic patch of the synthetic image.

According to an embodiment of the disclosure there may be provided a method that may include obtaining one or more acquired images; identifying for a given acquired image, one or more image areas associated with suspected defects; generating, for an identified image area associated with a suspected defect, a synthetic image based on patches of the one or more acquired images; and deciding if a defect is present in a location corresponding to the identified image area based on comparison of the image area with the synthetic image.

The patches of the one or more acquired images are portions of acquired images which are acquired at different acquisition conditions than those used for acquiring the given acquired image.

The different acquisition conditions may include transmissive image acquisition conditions and reflected image acquisition conditions.

The different acquisition conditions may include different focus conditions.

The different acquisition conditions may include different polarization conditions.

The generating of the synthetic image may include selecting the patches based on a similarity criterion.

The similarity criterion is responsive to an environment of the patch.

The generating of the synthetic image may include selecting the patches based on an average gray level of all similar patches computed via non-parametric Kernel Density Estimate (KDE).

The generating of the synthetic image may include associating each pixel of the synthetic image with pixel characteristics calculated based on pixel characteristics of similar patches.

The pixel characteristics may include at least one out of gray level values, a gradient value and a shot noise level.

The deciding if the defect is present in the location associated with the identified image area may include determining whether a difference between the identified image area and a corresponding synthetic image is above a predetermined value.

The deciding if the defect is present in the location associated with the identified image area may include determining whether a difference between the identified image area and a corresponding synthetic image is above a threshold value that relates to a ratio between a difference normalized by a standard deviation of a reconstructed pixel across similar patches.

The obtaining of the one or more acquired images may include acquiring only the given acquired image.

According to an embodiment of the disclosure there may be provided an inspection system that may include a processor and a memory module; wherein the memory module may be configured to store one or more acquired images; wherein the processor may be configured to identify, for a given acquired image, one or more image areas associated with suspected defects; generate, for an identified image area associated with a suspected defect, a synthetic image based on patches of the one or more acquired images; and decide if a defect is present in a location corresponding to the identified image area based on comparison of the image area with the synthetic image.

BRIEF DESCRIPTION OF THE DRAWINGS

The subject matter of this disclosure is particularly pointed out and distinctly claimed in the concluding portion of the specification. The disclosure, however, both as to organization and method, together with objects, features, and advantages thereof, may best be understood by reference to the following detailed description when read with the accompanying drawings in which:

Figure 1:
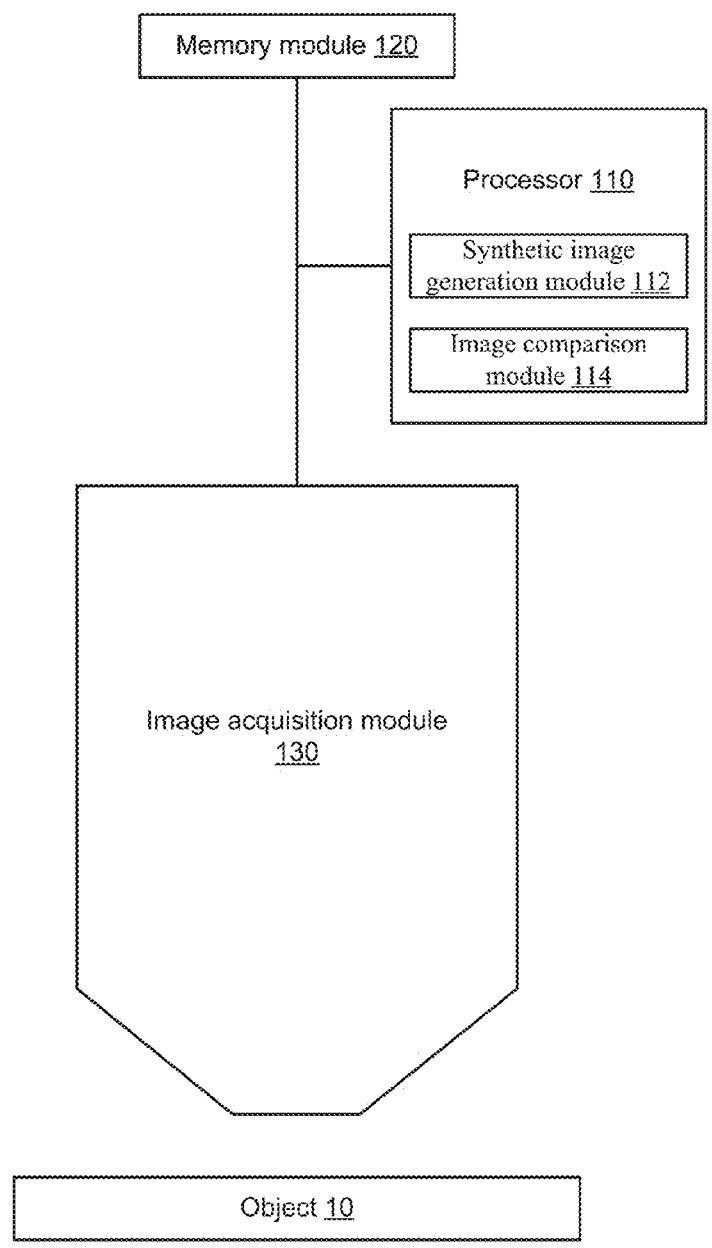
FIG. 1 illustrates a system and an object according to an embodiment of the disclosure.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE DRAWINGS

In the following detailed description, numerous specific details are set forth in order to provide a thorough understanding of the disclosure. However, it will be understood by those skilled in the art that the present disclosure may be practiced without these specific details. In other instances, well-known methods, procedures, and components have not been described in detail so as not to obscure the present disclosure.

The subject matter regarded as the disclosure is particularly pointed out and distinctly claimed in the concluding portion of the specification. The disclosure, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present disclosure may for the most part, be implemented using electronic components and circuits known to those skilled in the art, details will not be explained in any greater extent than that considered necessary as illustrated above, for the understanding and appreciation of the underlying concepts of the present disclosure and in order not to obfuscate or distract from the teachings of the present disclosure.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

FIG. 1 illustrates inspection system 100 and object 10 according to an embodiment of the disclosure.

Inspection system 100 is illustrates as including processor 110, memory module 120 and an image acquisition module 130.

Memory module 120 is configured to store a first image of an area of object 10 and a second image of the area of the object.

Processor 110 is illustrated, in a schematic manner, as including a synthetic image generation module 112 and image comparison module 114. Processor 110 is configured to generate a synthetic image of the area of the object, and to compare the synthetic image to the second image to provide defect detection results.

Processor 110 is configured to generate the synthetic image by repeating, for each first patch out of a group of first patches that belong to the first image, the operations of: (a) searching for relevant reference patches, wherein each relevant reference patch has a reference patch signature that is similar to a first patch signature of the first patch; and (b) when detecting the relevant reference patches then processing the relevant reference patches to provide a synthetic patch of the synthetic image.

Image acquisition module 130 may acquire the first image using one or more beams of electromagnetic radiation. The electromagnetic radiation may be, for example, visible light radiation, ultra violet radiation, deep ultraviolet radiation, extreme ultraviolet radiation, electron beam radiation, infrared radiation, and the like.

The disclosure is not limited by the type of image acquisition techniques and by the configuration of the image acquisition module. The disclosure may be implemented with commercially available wafer inspection and mask inspection tools. In many such systems the processor is embedded on-tool (together with the respective memory unit), and is configured to perform several image processing tasks ('image processor'). It should be noted that the operations to be carried out by the synthetic image generation module 112 and/or image comparison module 114 may be performed by processor 110 in addition to any other image processing operations. The disclosure can be implemented as module integrated with the image processor. The image processor may also be provided as a stand-alone system connected to the inspection tool. It should be noted that the operations to be carried out by the synthetic image generation module 112 and/or image comparison module 114 need not be carried out by the same processor.

Prior art inspection systems are configured to acquire images of the object to be inspected, store them on a memory unit and process the acquired images to detect defects using known image comparison techniques such as die-to-die, cell-to-cell, die-to-model, patch-to-patch and the like. The disclosure can be implemented as a method of defect detection that can be used in addition to, or as a replacement of known image comparison techniques.

Figure 2:
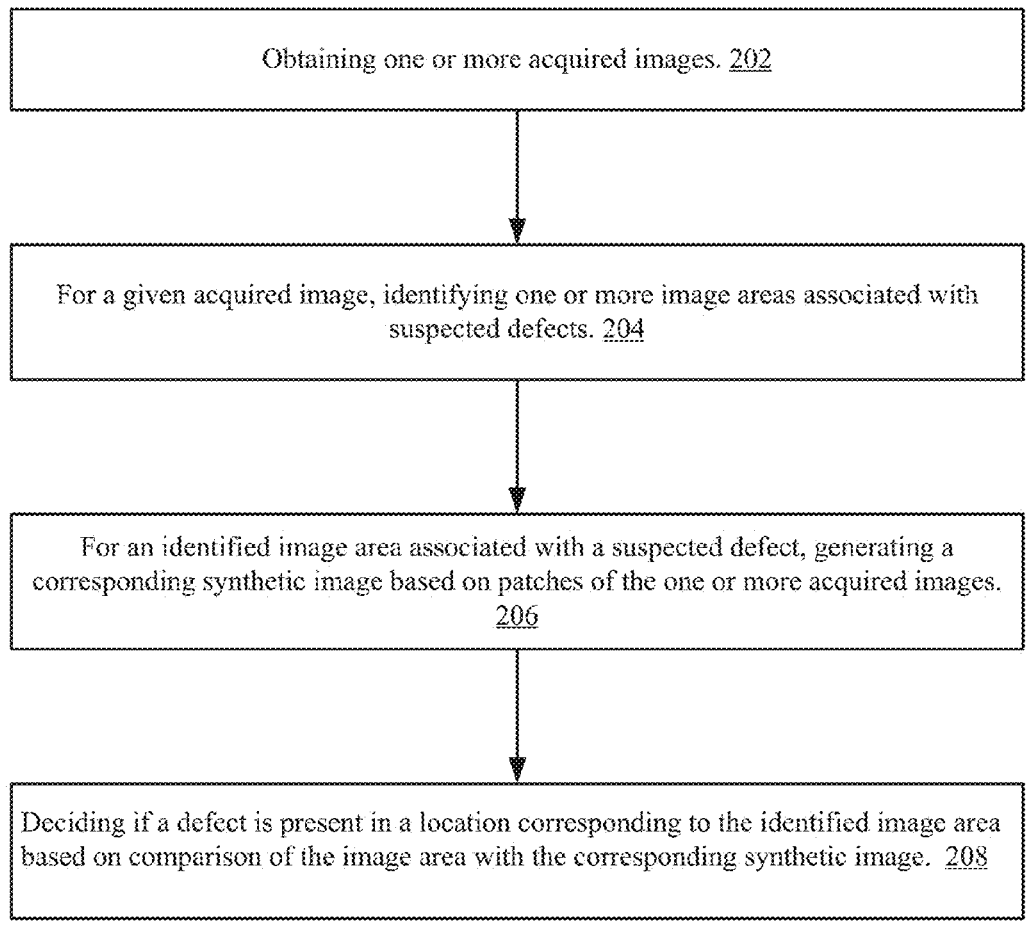
FIG. 2 illustrates a method according to an embodiment of the disclosure.

According to an embodiment of the disclosure the processor 110 is configured to carry out the operations 201 illustrated FIG. 2: in operation 202, obtaining one or more acquired images; in operation 204, for a given acquired image, identifying one or more image areas associated with suspected defects; in operation 206, for an identified image area associated with a suspected defect, generating a corresponding synthetic image based on patches of the one or more acquired images; and in operation 208, deciding if a defect is present in a location corresponding to the identified image area based on comparison of the image area with the corresponding synthetic image.

According to an embodiment of the disclosure, the patches of the one or more acquired images are portions of acquired images which are acquired at different acquisition conditions than those used for acquiring the given acquired image.

According to an embodiment of the disclosure the different acquisition conditions may include transmissive image acquisition conditions and reflected image acquisition conditions.

According to an embodiment of the disclosure the different acquisition conditions comprise different focus conditions.

According to an embodiment of the disclosure the different acquisition conditions comprise different polarization conditions.

According to an embodiment of the disclosure the generating of the synthetic image comprises selecting the patches based on a similarity criterion.

According to an embodiment of the disclosure the similarity criterion is responsive to an environment of the patch.

According to an embodiment of the disclosure the generating of the synthetic image comprises selecting the patches based on an average gray level of all similar patches computed via non-parametric Kernel Density Estimate (KDE).

According to an embodiment of the disclosure the generating of the synthetic image comprises associating each pixel of the synthetic image with pixel characteristic calculated based on the pixel characteristics of similar patches.

According to an embodiment of the disclosure the pixel characteristics comprise at least one out of gray level values, a gradient value and a shot noise level.

According to an embodiment of the disclosure the deciding if the defect is present in the location associated with the identified image area comprises determining whether a difference between the identified image area and a corresponding synthetic image is above a predetermined value.

According to an embodiment of the disclosure the deciding if the defect is present in the location associated with the identified image area comprises determining whether a difference between the identified image area and a corresponding synthetic image is above a threshold value that relates to a ratio between a difference normalized by a standard deviation of a reconstructed pixel across similar patches.

The disclosure is not limited by the manner of identifying one or more image areas as being associated with suspected defects, and this operation can be performed by any of the techniques known in the art. Inspection system 100 may identify the suspected defects. Alternatively, another system may identify the suspected defects.

The disclosure is not limited by the manner of deciding if a defect is present in a location corresponding to the identified image area based on comparison of the area image with the corresponding synthetic image. Many comparison techniques can be used, such as intensity-based comparison. For example, a difference image of the area image and the synthetic image may be generated for example by subtracting the pixel gray level values (intensity) of the synthetic image from those of the area image ('diff'), and then discarding diff image pixels with gray level values below a predetermined value. According to another example, a decision can be made based on a threshold value that relates to the ratio between the difference of the pixel from the acquired image and its corresponding synthetic pixel, normalized by the STD of the synthetic pixel across the similar patches.

According to an embodiment of the disclosure, the synthetic image may be generated using images taken at different imaging conditions. For example, commercially available inspection tools can provide images which are acquired at different acquisition modes—such as reflection acquisition mode ('reflection images') and transmission acquisition mode ('transmission images') in the case of transparent objects such as lithographic masks. Other examples are images taken at different exposure conditions, different focus conditions, different polarity conditions or any other acquisition conditions.

According to an embodiment of the disclosure, the synthetic image is generated by using patches of one or more acquired images. The term 'patch' is used herein to denote a portion of an image. The size and shape of a patch can be set in advanced, during a set-up phase, based on operation al needs or based on empiric findings. For ease of explanation the disclosure will be illustrated herein with reference to a patch having a rectangular shape, comprising 5×5 pixels or 10×5 pixels but the disclosure is not limited thereto and a patch can be defined in many shapes and sizes. A shape and/or size of a patch may be selected in an arbitrary manner, in a non-arbitrary manner, in a random manner, in a pseudo-random manner, in response to sizes of features, and the like.

The size and shape of a patch can be set to ensure that a similarity criterion between patches can be evaluated. The disclosure is suitable for images having pattern structures. A patch includes at least one pattern structure that appears in other patches of the same image, so that an evaluation of the similarity of the patches can be evaluated.

The disclosure is not limited by the manner of evaluating the similarity of patches. Many known techniques may be used, for example by using a predefined similarity criterion. Examples of the predefined similarity criterion can includes, and are not limited to, a predefined threshold of an absolute gray-level difference, an absolute signal-to-noise ratio, a normalized correlation, and a patch signature.

The pattern structures that are included in more than a single patch, need not be periodic. Periodic repeating pattern structures are commonly referred to as 'cells' and 'cell-to-cell' comparison techniques are known in the art. A 'cell' is a specific example of a 'patch'.

The term 'synthetic image' is used herein to denote an image that is synthetically generated (reconstructed) by processing patches of images acquired by the inspection tool. According to embodiments of the disclosure, the synthetic image relates to all the object area which is imaged by the acquired image. According to other embodiments, the synthetic image is composed of fragments relating to portions of the area imaged by the acquired image (region of interest). The synthetic image is indicative of a prediction of an image corresponding to a certain imaging condition, which is reconstructed based on an image acquired at different imaging conditions.

The patch-based reconstruction will be described, in a simplified and illustrative manner, with reference to defect detection of single die masks. For single-die masks, no previously-acquired images of other dies are available to serve as reference. The patch-based reconstruction approach of the disclosure provides an improved technique for finding pattern irregularities or abnormal pixel intensity relations between different imaging conditions.

Figure 3:
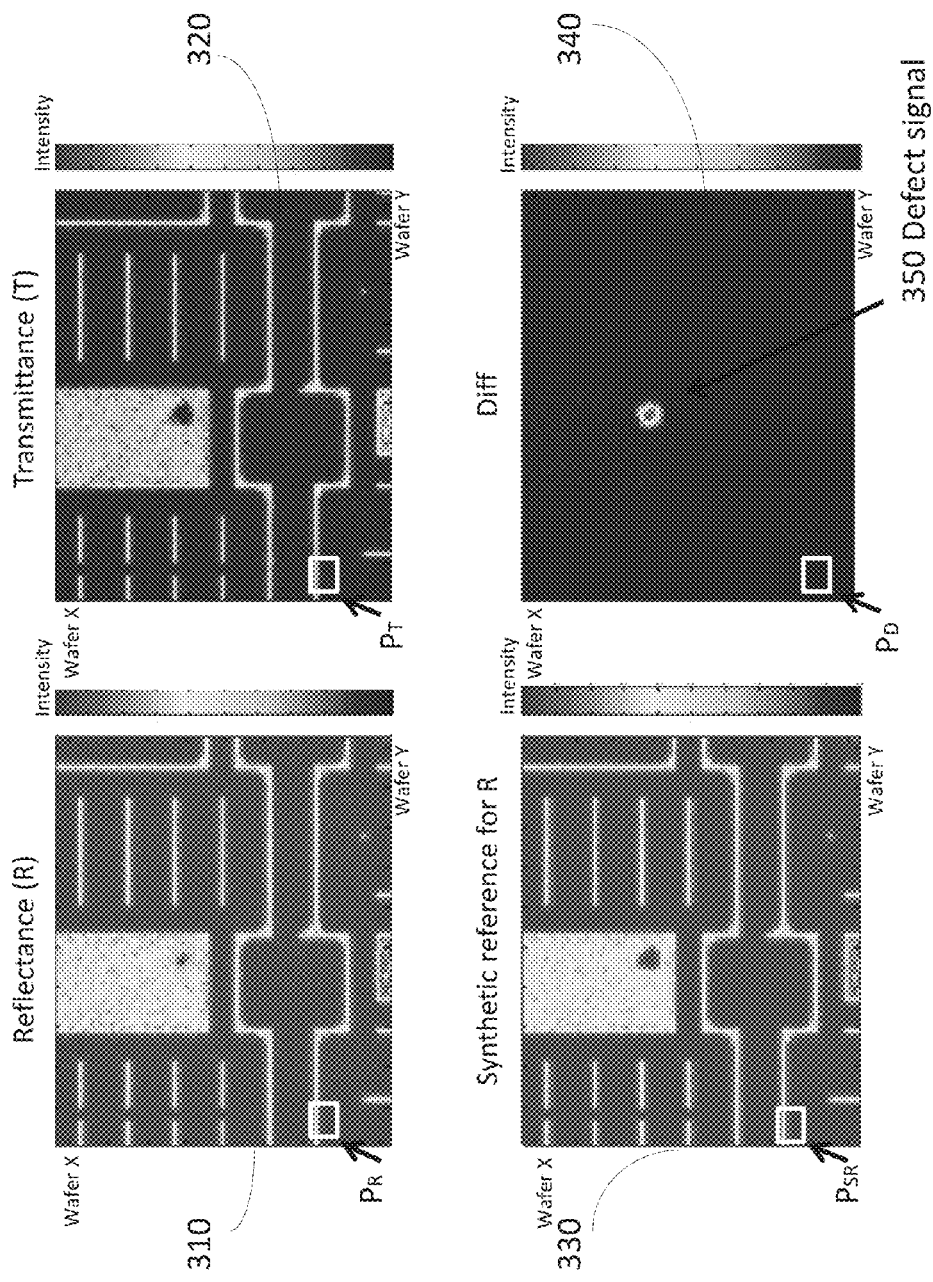
FIG. 3 illustrates images of a lithographic mask which were acquired using reflection mode and transmission mode according to an embodiment of the disclosure.

FIG. 3 illustrates images of a lithographic mask which were acquired using reflection mode (310—labeled 'reflectance') and transmission mode (320—labeled 'transmittance') according to an embodiment of the disclosure.

The transmittance image is then used for reconstructing, in a patch-based reconstruction process according to the disclosure, a synthetic image (330—labeled 'synthetic reference for reflectance'). The synthetic reference may be used as a reference for the reflectance image. The reflectance image is compared with the reference by way of generating a 'diff' image (340—labeled 'Diff'). A defect signal 350 is clearly evident and is clearly different from the other pixels of the diff image.

It is assumed that the reflectance image 310 and the transmittance image 320 are accurately registered. If needed, a registration operation can be performed during a preprocessing operation (not shown in FIG. 2). With reference to a specific area within the image, a given patch in the reflectance image—a single patch $P_R$ is illustrated, is associated with a corresponding patch in the transmittance image—patch $P_T$. Patch $P_T$ is covering the same object area as patch $P_R$. The patches $P_R$, $P_T$ can be associated by any known technique, for example, based on a location of the lower left patch corner. Patches in the transmittance image which are similar to patch $P_T$ (similar patches $P_T$, not shown in FIG. 3) are found. The plurality of similar patches $P_T$ are used for reconstructing patch $P_{SR}$ in the synthetic image.

According to an embodiment of the disclosure, the gray level value of each of the pixels of patch $P_{SR}$ is calculated based on the gray level values of the corresponding pixels of the plurality of similar patches $P_T$. For example, the gray level value of each of the pixels of patch $P_{SR}$ is calculated based on the gray level values of the corresponding pixels of the plurality of similar patches $P_T$. For example, the gray level value of $P_{SR}$ pixels may be calculated as the average of all or part of the gray level values of the pixels of the similar patches $P_T$. Closest value—or any other statistical calculations, may also be used.

Repeating this process patch-by-patch allows for the reconstruction of the entire object area which is covered by the transmittance image 320, giving rise to synthetic reference 330. The synthetic reference 330 is a representation of a prediction of how the reflectance image 310 should look like based on the transmittance image 320. Put differently, statistics of pairs of registered reflectance/transmittance patches is used to compute the expected value for each reference pixel.

The synthetic reference 330 is then used as a reference and is compared to the reflectance image 310. Image 340 is a 'diff' image of the reflectance image 310 and the synthetic reference 330. The gray level values of the pixels of patch $P_D$ are equal zero, indicating that the reflectance patch $P_R$ and the reference patch $P_{SR}$ are substantially the same and that no defect is present at the object area covered by reflectance patch $P_R$.

To the contrary, the gray level values of the diff pixels in the area of defect signal 350 are of non-zero values. The patch based reconstruction process was unable to accurately predict the reflectance image in the area of the defect, as there were no similar patches (or very few similar patches). As a result, the synthetic image pixels at the area of the defect were assigned with gray level values which are different from the gray level values of the reflectance pixels at the corresponding area, giving rise to a defect signal 350 that is clear.

Figure 4:
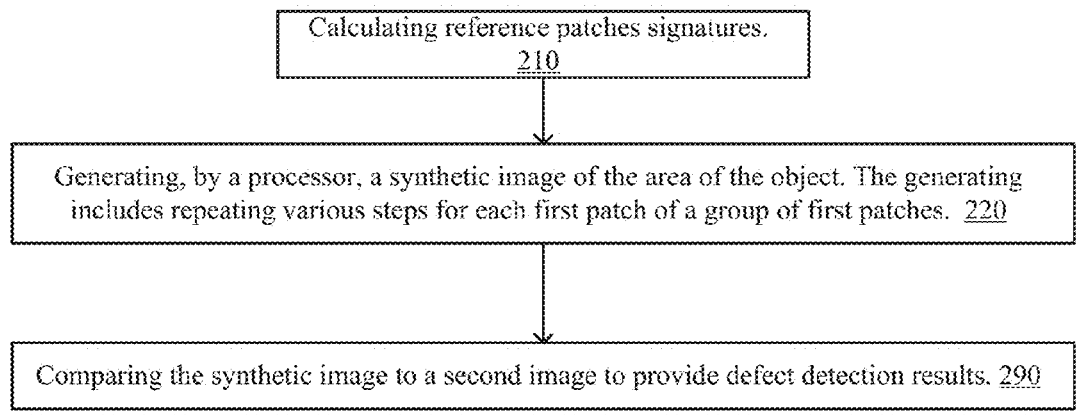
FIG. 4 illustrates a method according to an embodiment of the disclosure.

FIG. 4 illustrates method 200 according to an embodiment of the disclosure.

Method 200 may start by operation 210 of calculating reference patches signatures.

Each reference patch is associated with a first image pixel. A reference patch includes the first image pixel associated with the reference patch. A reference patch may be a rectangular grid of first image pixels but may have any other format.

The reference patches may be associated with any combination of first image pixels. For example, the reference patches may be associated with all of the first image first image pixels, may be associated with a majority of first image pixels, may be associated only with first image pixels that are included in regions of interest of the first image, and the like.

Reference patches signatures may be defined in various manners. For example, a reference patch signature may include information related only to pixels of the reference image. Yet for another example, a reference patch signature may include information of pixels that belong to the reference image and also to pixels of another image.

Reference patches signatures may be arranged in searchable data structures in various manners. For example, the reference patches signatures may populate a K-D tree. When the reference patches are associated with a relative small fraction of the first image pixels then searching the K-D tree may be effective.

Operation 210 may be followed by operation 220 of generating, by a processor, a synthetic image of the area of the object.

Operation 220 may be followed by Operation 290 of comparing the synthetic image to a second image to provide defect detection results.

Operation 220 may include repeating, for each first patch out of a group of first patches, multiple operations.

The group of patches may be associated with any combination of first image pixels. For example, the group may include first patches associated with all of the first image first image pixels, may include first patches associated with a majority of first image pixels, may be limited to first patches that are associated with first image pixels that are included in regions of interest of the first image, may be associated with pixels of suspected defects, and the like.

Figure 5:
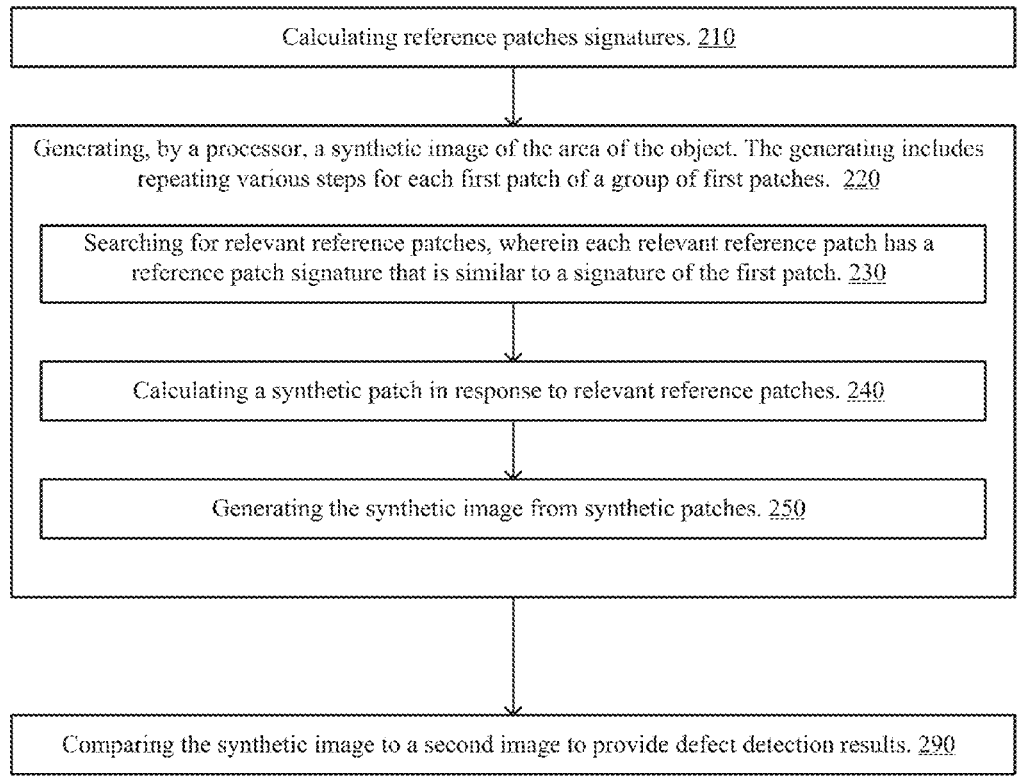
FIG. 5 illustrates a method according to an embodiment of the disclosure.

FIG. 5 illustrates that the multiple operations (included in operation 220) may include operations 230, 240 and 250.

Operation 230 may include searching for relevant reference patches, wherein each relevant reference patch has a reference patch signature that is similar to a signature of a first patch.

If relevant reference patches are detected then operation 230 may be followed by operation 240 of calculating a synthetic patch in response to relevant reference patches.

Operation 240 may include applying any mathematical function on the relevant reference patches. Non-limiting examples of such a mathematical function may include an average function, a weighted average function, a median function, a Gaussian weighted averaging function, and the like.

A weight assigned to a relevant reference patch may be responsive to the distance between the first patch and relevant reference patch, to a size of the first patch, and to a distance between After repeating operations 230 and 240 of each first image patch of the group of patches the method may proceed to operation 250 of generating the synthetic image from the synthetic patches.

Each synthetic patch may be positioned at a synthetic patch location that corresponds to the first patch location. The synthetic patches may be then processed to provide the synthetic image. For example, when one or more synthetic processes partially overlap the overlapping pixels can be calculated by applying an averaging function, a weighted sum function, a statistical function or any other function to provide the pixels of the synthetic image.

Figure 6:
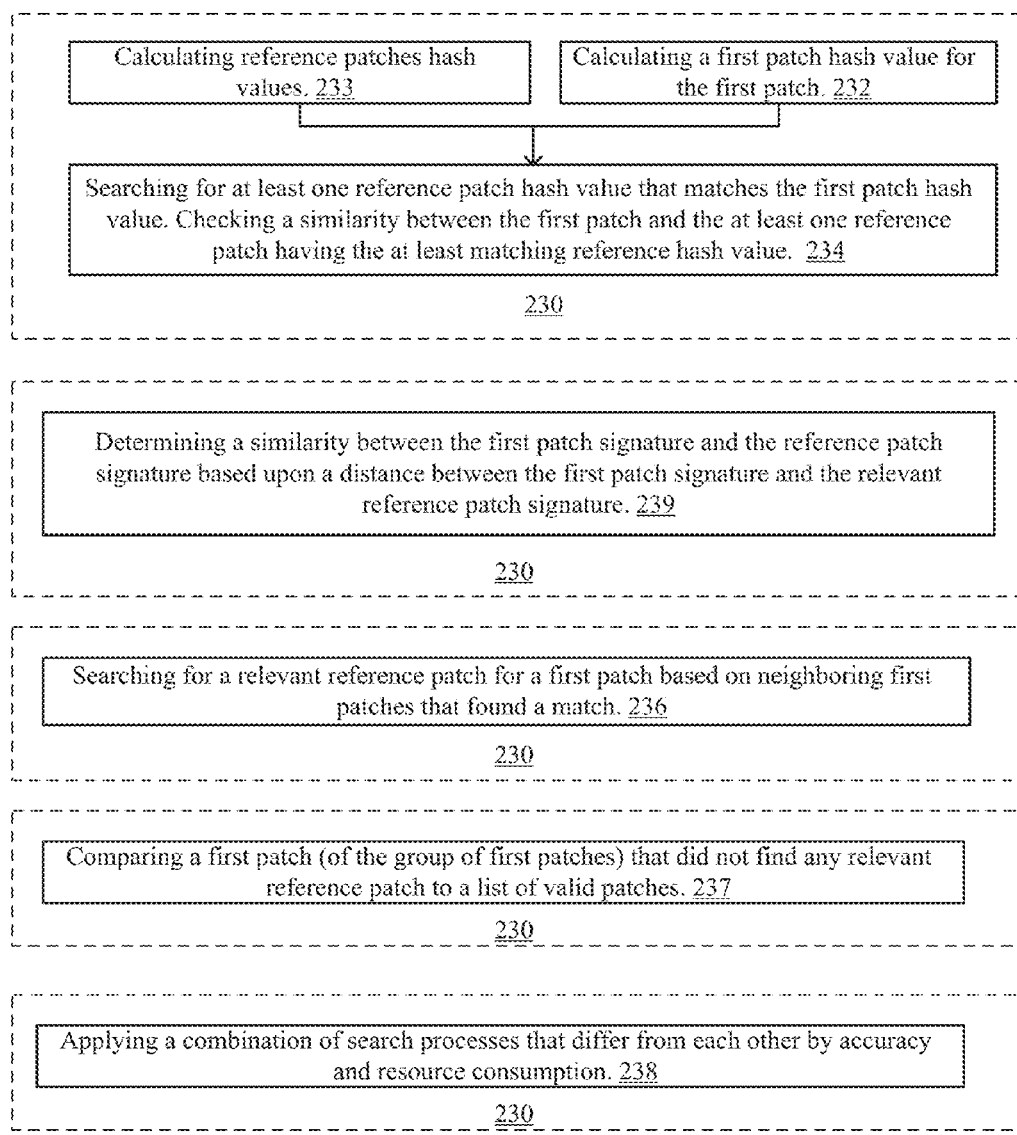
FIG. 6 illustrates an operation of the method of FIG. 5 according to various embodiments of the disclosure.
Figure 7:
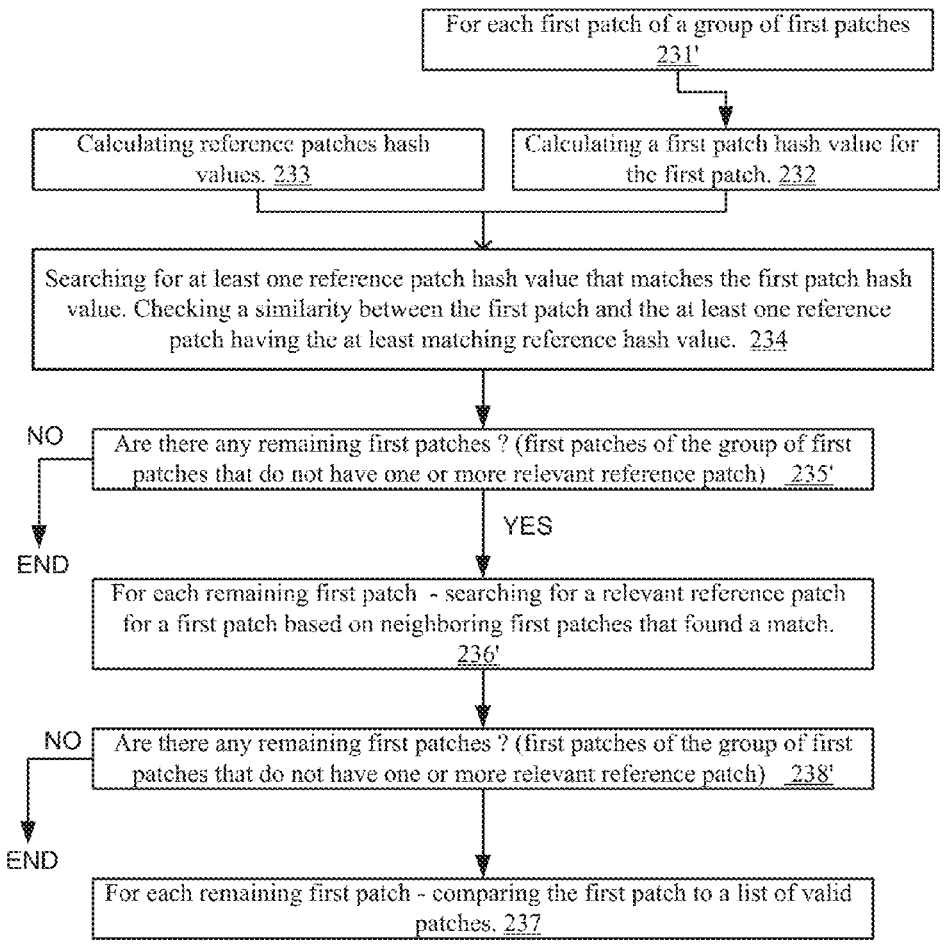
FIG. 7 illustrates an operation of the method of FIG. 5 according to an embodiment of the disclosure.

FIGS. 6 and 7 illustrate operation 230 according to various embodiments of the disclosure.

FIG. 6 illustrates that operation 230 may include operation 239 of determining a similarity between the first patch signature and the reference patch signature based upon a distance between the first patch signature and the relevant reference patch signature.

Additionally or alternatively, operation 230 may include operations 233, 232 and 234.

According to an embodiment of the disclosure the search for relevant reference patches may be accelerated (at the expense of accuracy) by performing a hash based search. Accordingly, operation 230 may include operation 232 of calculating a first patch hash value for the first patch (for each first patch of the group), and operation 233 of calculating reference patches has values.

Operation 232 may include applying a distance conserving hash function.

A hash value of a first patch signature may be much smaller than the first patch signature. For example a first patch signature that includes twenty five thirty intensity fields and two spatial relationship fields—each field of 32 bits may have a twenty eight bit hash value.

Operation 232 may be followed by operation 234 of searching for at least one reference patch hash value that matches the first patch hash value. Operation 234 may also include checking a similarity between the first patch and the at least one reference patch having the at least matching reference hash value.

Operation 234 may include calculating the distance between the first patch hash value and reference patches hash values.

Operation 234 may include checking up to a predefined number (for example five) of reference patches that have reference hash values that match the first patch hash value. The checking may include calculating the distances between the first patch signature and the reference patch value signatures.

Operation 234 may include defining a match as having an exact match between the first patch hash value and a reference patch hash value. Alternatively, a match may be obtained when a distance between the first patch hash value and a reference patch hash value is below a predefined hash distance threshold.

Additionally or alternatively, operation 230 may include operation 236 of searching for a relevant reference patch for a first patch based on neighboring first patches that found a match. If, for example, there is a certain spatial relationship between a neighboring first patch (that found a matching reference patch) and the first patch then operation 236 will search for a match between the first patch and a reference patch of the reference image that also have the certain spatial relationship between them.

For example, assuming that a certain first patch is centered about a certain first pixel. Also assuming that a match was found between a predefined reference patch and a neighboring first patch that is centered about a neighboring first pixel. The predefined reference patch is centered about a predefined reference pixel. The neighboring first pixel is one pixel to the left of the certain first pixel. Then—during operation 236 method 200 will try to compare the certain first patch to a reference patch that is centered one pixel to the left of the predefined reference pixel.

Operation 236 may be executed for each first patch that did not find a match during operation 234.

Additionally or alternatively, operation 230 may include operation 237 of comparing a first patch (of the group of first patches) that did not find any relevant reference patch to a list of valid patches. The list of the valid patches may be arranged as a KD tree. The list of valid patches may include an image of the valid patches or any other representation of the valid patches.

Additionally or alternatively, operation 230 may include operation 238 of applying a combination of search processes that differ from each other by accuracy and resource consumption.

Operations 233, 232 and 234 may provide an example of a search process that is less accurate and less resource consuming than operation 236. Operation 236 may provide an example of a search process that is less accurate and less resource consuming than operation 237.

In order to speed up the searching for the relevant reference patches, operation 238 may start by applying a first search process that is less accurate but low resource consumption process. Only when the first search fails operation 238 may proceed to apply a second process that is more accurate than the first search process but has higher resource consumption. This iterative process may proceed to more than two search processes.

According to an embodiment of the disclosure the first search process may find relevant reference patches for a first subset of first patches of the group of first patches. The second search process can be applied on the remaining first patches of the group of first patches.

According to an embodiment of the disclosure, method 200 may use prior knowledge. The prior knowledge may include valid patches of the object that should not be considered as faulty. These valid patches may be, for example, unique patches that may not match any reference patch.

FIG. 7 illustrates operation 230 according to an embodiment of the disclosure.

Operation 230 may include repeating (see box 231') for each first patch of a group of first patches, operation 232. Operation 233 and operation 233 are followed by operation 234.

After the completion of operations 232, 233 and 234 operation 230 checks if there are any remaining first patches of the group of first patches (operation 235'). A remaining first patch is a first patch for which no relevant reference patch was found. If the answer is negative (no remaining first patches) then operation 230 ends. If the answer is positive then operation 235' is followed by operation 236' of searching (for each remaining first patch) searching for a relevant reference patch for a first patch based on neighboring first patches that found a match.

Operation 236' is followed by operation 238' of checking if there are any remaining first patches of the group of first patches. If the answer is negative (no remaining first patches) then operation 230 ends. If the answer is positive then operation 238' is followed by operation 237 of comparing each remaining first patch to a list of valid patches.

Operation 230 may include operation 239 of determining a similarity between the first patch signature and the reference patch signature based upon a distance between the first patch signature and the reference patch signature. If the distance is lower than a predefined distance threshold than the reference patch is deemed to be a relevant patch.

The similarity test of operation 239 may be applied during operations 234, 236', and 237'.

Figure 8:
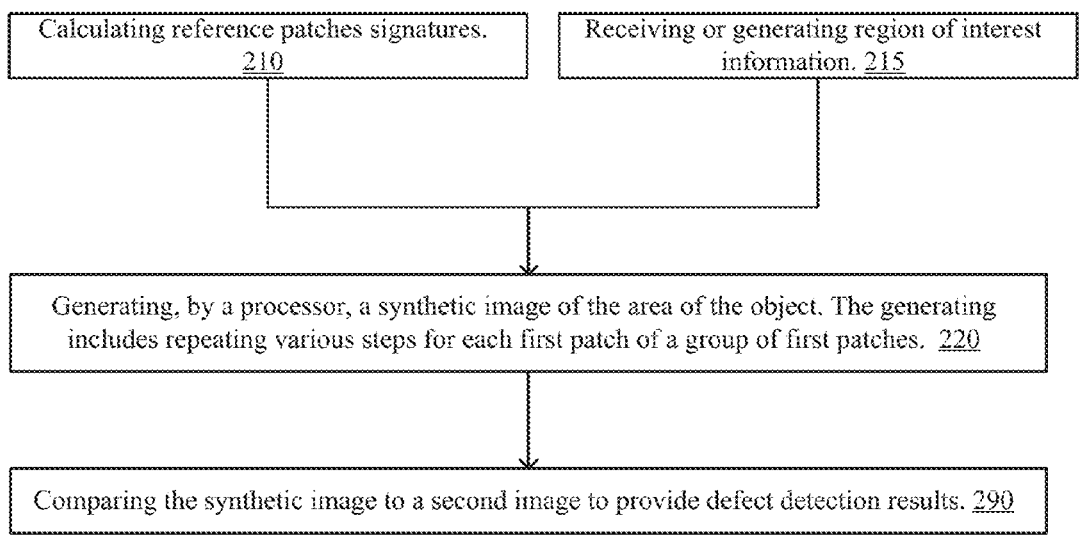
FIG. 8 illustrates a method according to an embodiment of the disclosure.

FIG. 8 illustrates method 500 according to an embodiment of the disclosure.

Method 500 differs from method 200 by including operation 215 of receiving or generating information about regions of interest within the area of the object.

The group of first patches and/or the second group of first patches may exclude patches that are associated with pixels located outside the regions of interest.

According to an embodiment of the disclosure the object is a lithographic mask and wherein the regions of interest correspond to a printability of regions of the lithographic mask.

For example—a region of interest may include only a printable region of the lithographic mask that will be cause a feature to be printed on a wafer during the lithographic process. Yet for another example a region of interest may be proximate (1 till few pixels) to such a printable region.

Figure 9:
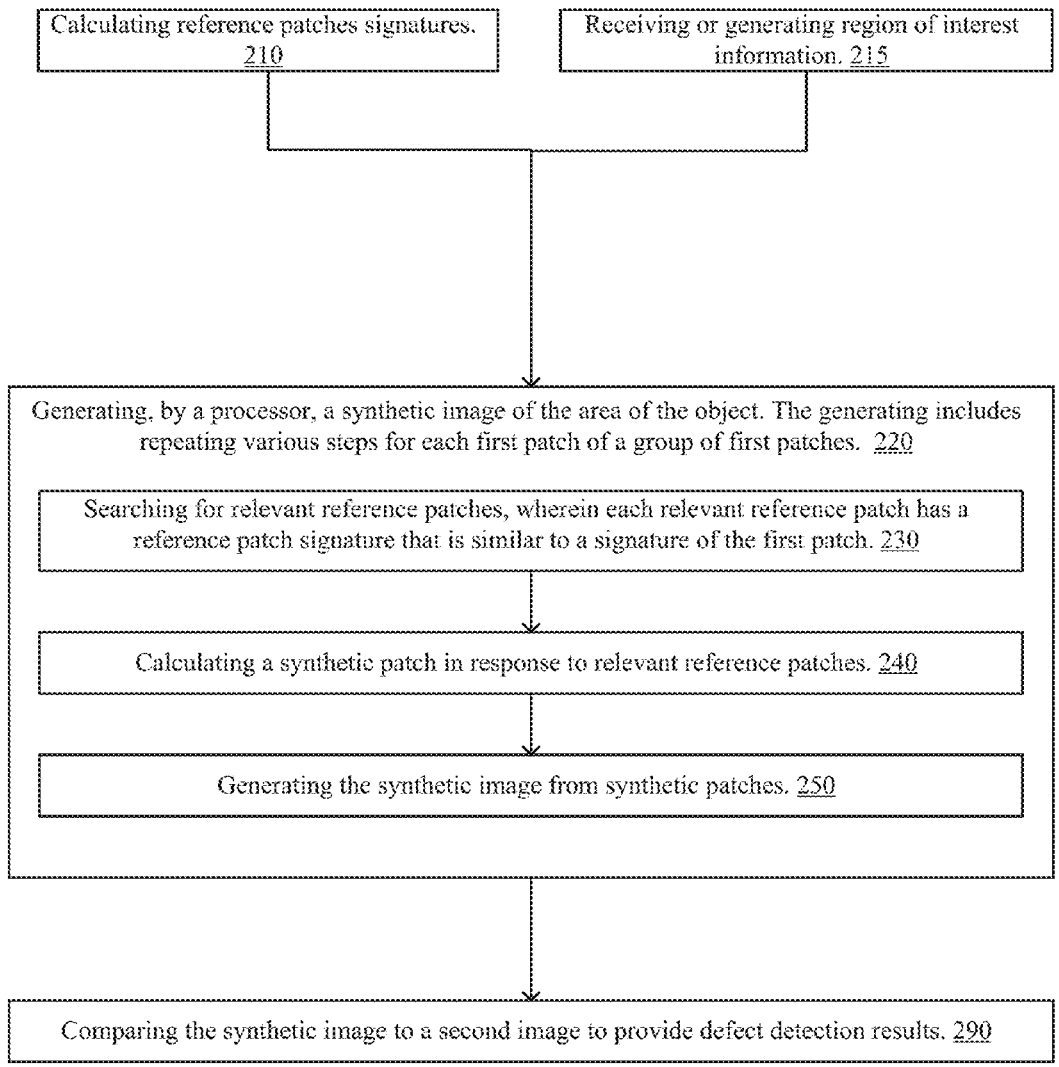
FIG. 9 illustrates a method according to an embodiment of the disclosure.

FIG. 9 illustrates method 500' according to an embodiment of the disclosure.

Method 500' differs from method 200' by including operation 215 of receiving or generating information about regions of interest within the area of the object.

Figure 10:
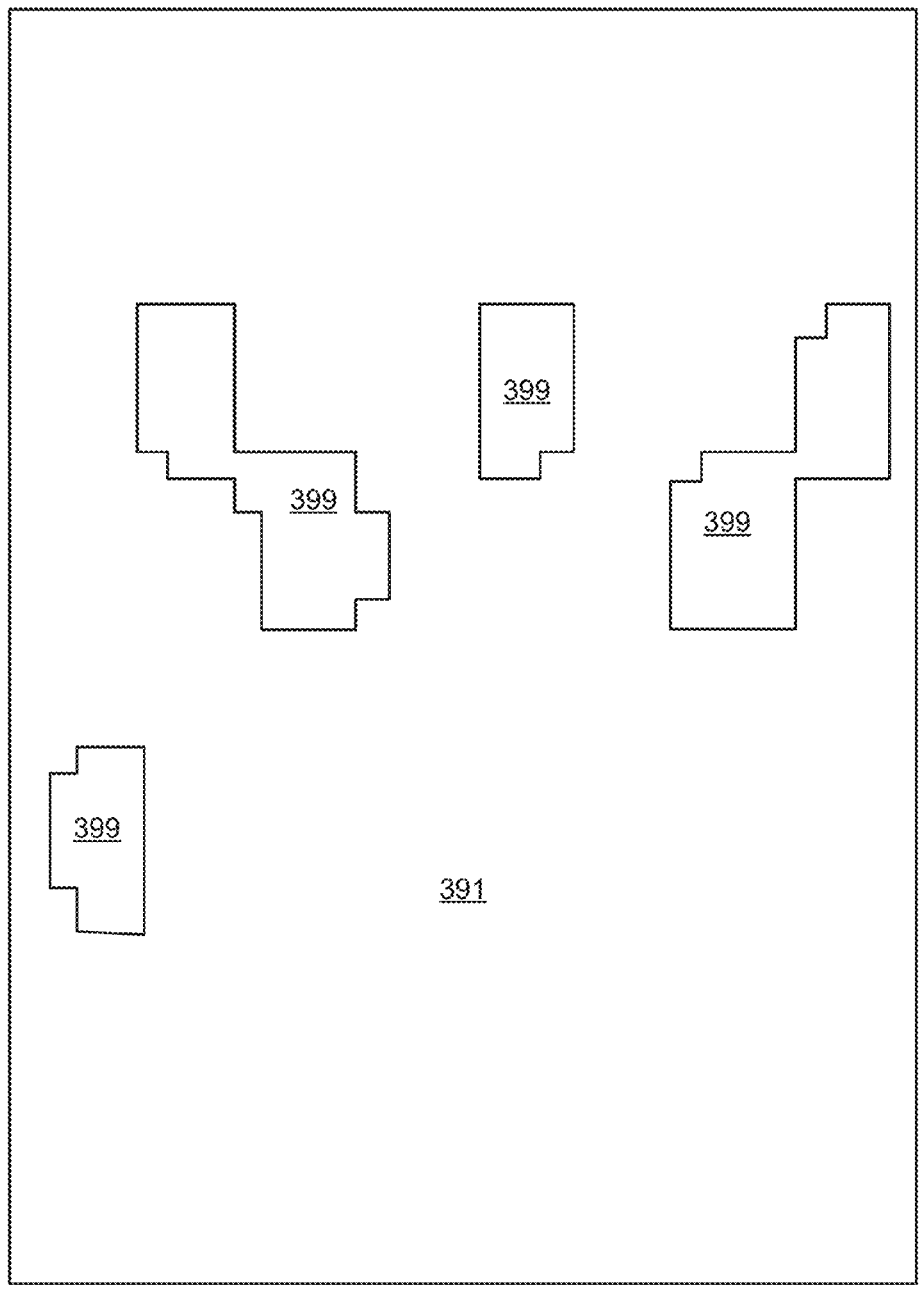
FIG. 10 illustrates a first image and regions of interest according to an embodiment of the disclosure.

FIG. 10 illustrates first image 391 and regions of interest 399 according to an embodiment of the disclosure.

Context Patch.

According to an embodiment of the disclosure there is provided a context patch. The context path may be used for situations where the reference patch is ambiguous in terms of the corresponding target image (called second image here) patch. In some cases, the same reference patch can correspond to several different target image patches. For example, this happens frequently in die-to-model cases due to imperfect model image simulation. In these cases, the patch based inspection will need additional information to distinguish the different options (modes) for the target patch. This information may come in the form of the context patch (taken in a surrounding region of the target image).

Accordingly—a signature of a patch may include information about intensities of pixels of the image that includes the patch but also may include information about pixels from a second image.

For example—a signature of a patch may include information about intensities of pixels of a second image region. The first patch and the second image region are located at similar locations within the first image and the second image, respectively. For example—the second image region may be located, within the second image, at a second image region location. The second image region location is proximate to second image location that corresponds to the first patch location.

According to an embodiment of the disclosure the second image region may surround second image pixels that are located, in the second image, at the second image location that corresponds to the first patch location.

For example—the first patch may include N1 rows and N1 columns of first image pixels centered about a (x,y)'th first image pixel. The second image region may include N2 rows and N2 columns of second image pixels centered about a (x,y)'th second image pixel. N2 and N1 are positive integers that exceed one and N2 exceeds N1.

According to another example—the second image region second image region may include N2 rows and N2 columns of second image pixels centered about a (x,y)'th second image pixel but does not include the N1 rows and the N1 columns of second image pixels that are centered about the (x,y)'th second image pixel.

Table 1 illustrates an example of a first patch of 3×3 first image pixels P1(x−1,y−1), P1(x−1,y), P1(x−1,y+1), P1(x,y−1), P1(x,y), P1(x,y+1), P1(x+1,y−1), P1(x+1,y) and P1(x+1,y+1) that centered about the (x,y)'th first image pixel (P1(x,y)).

Table 2 illustrates an example of a second image region that includes sixteen second image pixels P2(x−2,y+2), P2(x−1,y+2), P2(x,y+2), P2(x+1,y+2), P2(x+2,y+2), P2(x−2,y+1), P2(x+2,y+1), P2(x−2,y), P2(x+2,y), P2(x−2,y−1), P2(x+2,y−1), P2(x−2,y−2), P2(x−1,y−2), P2(x,y−2), P2(x+1,y−2), P2(x+2,y−2)—included within a 5×5 area but excluding the inner 3×3 second image pixels.

TABLE 1

| P1(x − 1, y + 1) | P1(x, y + 1) | P1(x + 1, y + 1) |
|---|---|---|
| P1(x − 1, y) | P1(x, y) | P1(x + 1, y) |
| P1(x − 1, y − 1) | P1(x, y − 1) | P1(x + 1, y − 1) |

TABLE 2

| P2(x − 2, y + 2) | P2(x − 1, y + 2) | P2(x, y + 2) | P2(x + 1, y + 2) | P2(x + 2, y + 2) |
|---|---|---|---|---|
| P2(x − 2, y + 1) | | | | P2(x + 2, y + 1) |
| P2(x − 2, y) | | | | P2(x + 2, y) |
| P2(x − 2, y − 1) | | | | P2(x + 2, y − 1) |
| P2(x − 2, y − 2) | P2(x − 1, y − 2) | P2(x, y − 2) | P2(x + 1, y − 2) | P2(x + 2, y − 2) |

According to a further example—the second image region may include N2 rows and N2 columns of pixels centered about a (x,y)'th second image pixel but may include only some of the second image pixels included in N1 rows and N1 columns of second image pixels centered about a (x,y)'th second image pixel.

Figure 11:
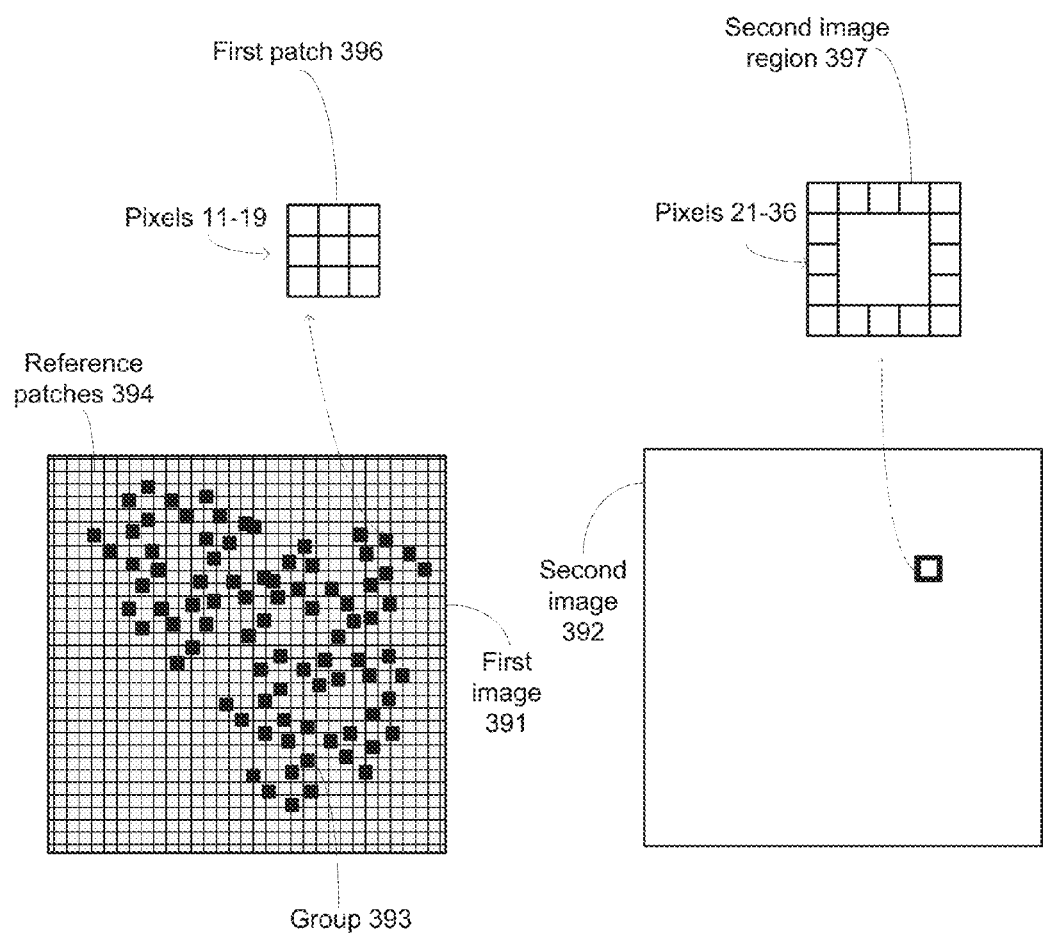
FIG. 11 illustrates a first patch signature according to an embodiment of the disclosure.
Figure 11:
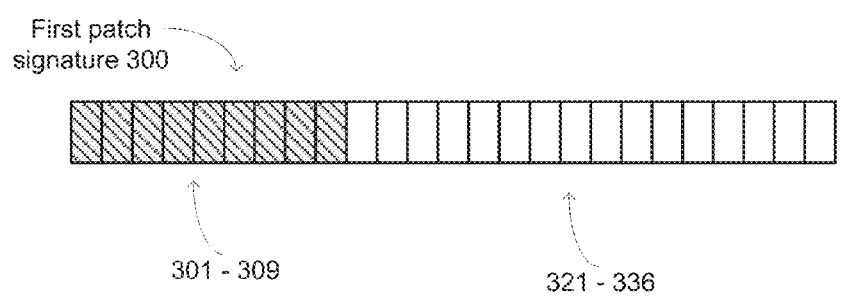

FIG. 11 illustrates first image 391, second image 392, group 393 of first patches, reference patches 394, first patch 396 and first patch signature 300 of the first patch 396 according to an embodiment of the disclosure.

In FIG. 11, group 393 of first patches includes only a part of the first image pixels—it may include first image pixels associated with suspected defects. In FIG. 11 the references patches 394 are associated with all first image pixels.

First patch signature 300 may include information 301-309 about intensities of first patch pixels P1(x−1,y−1) 11, P1(x−1,y) 12, P1(x−1,y+1) 13, P1(x,y−1) 14, P1(x,y) 15, P1(x,y+1) 16, P1(x+1,y−1) 17, P1(x+1,y) 18 and P1(x+1,y+1) 19.

First patch signature 300 may include information 321-336 about intensities of second image region pixels P2(x−2,y+2) 21, P2(x−1,y+2) 22, P2(x,y+2) 23, P2(x+1,y+2) 24, P2(x+2,y+2) 25, P2(x−2,y+1) 26, P2(x+2,y+1) 27, P2(x−2,y) 28, P2(x+2,y) 29, P2(x−2,y−1) 30, P2(x+2,y−1) 31, P2(x−2,y−2) 32, P2(x−1,y−2) 33, P2(x,y−2) 34, P2(x+1,y−2) 35 and P2(x+2,y−2) 36. The second image region pixels belong to second image region 397.

Information about the intensity of a pixel may be the intensity (gray level) of the pixel or any representation of the intensity of the pixel.

Figure 12:
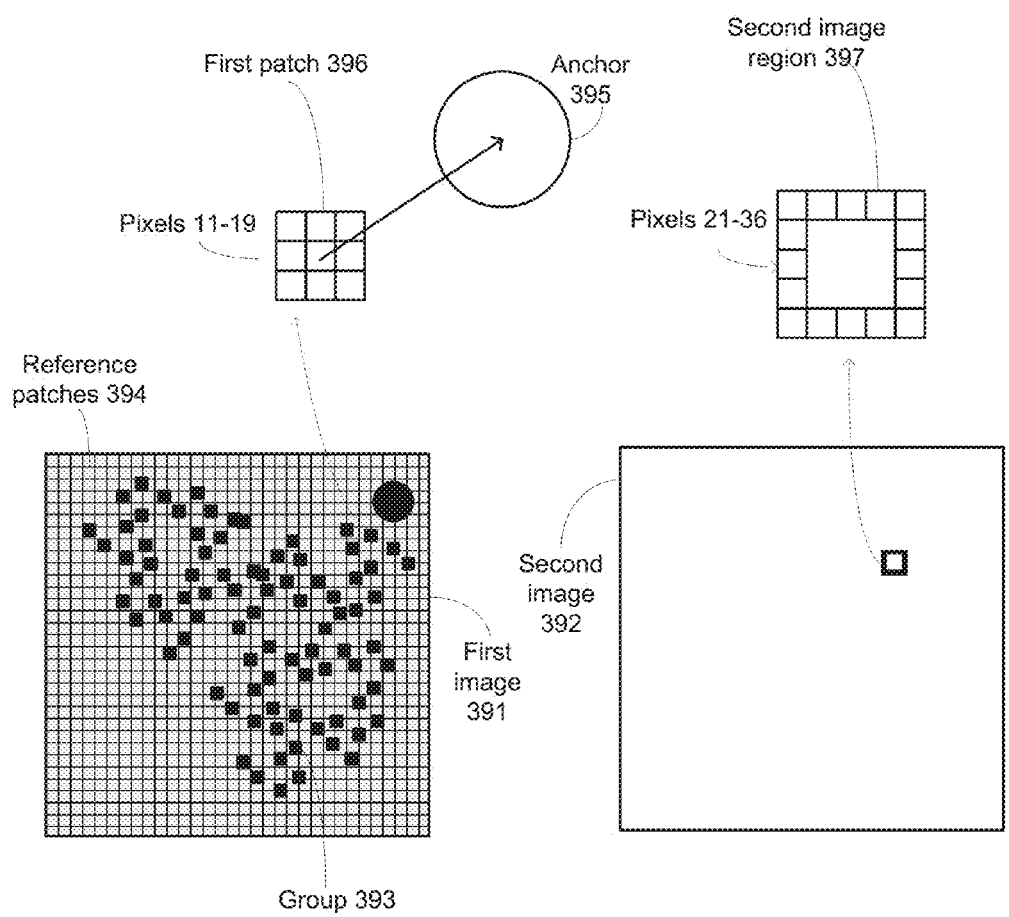
FIG. 12 illustrates a first patch signature according to an embodiment of the disclosure.
Figure 12:
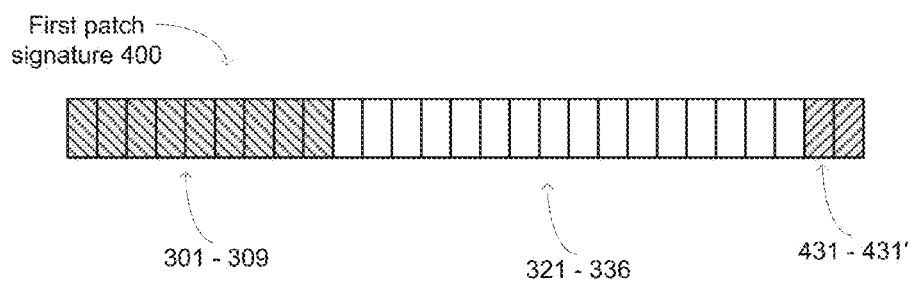

FIG. 12 illustrates first image 391, second image 392, group 393 of first patches, reference patches 394, anchor 395, first patch 396 and first patch signature 400 of the first patch 396 according to an embodiment of the disclosure.

First patch signature 400 differs from first patch signature 300 of FIG. 11 by further including spatial information (such as x-axis distance and y-axis distance) related to an anchor. The anchor may be the closest anchor to the first patch.

First patch signature 400 may include information 301-309 about intensities of first path pixels P1(x−1,y−1) 11, P1(x−1,y) 12, P1(x−1,y+1) 13, P1(x,y−1) 14, P1(x,y) 15, P1(x,y+1) 16, P1(x+1,y−1) 17, P1(x+1,y) 18 and P1(x+1, y+1) 19.

First patch signature 400 may include information 321-336 about intensities of second image region pixels P2(x−2,y+2) 21, P2(x−1,y+2) 22, P2(x,y+2) 23, P2(x+1,y+2) 24, P2(x+2,y+2) 25, P2(x−2,y+1) 26, P2(x+2,y+1) 27, P2(x−2, y) 28, P2(x+2,y) 29, P2(x−2,y−1) 30, P2(x+2,y−1) 31, P2(x−2,y−2) 32, P2(x−1,y−2) 33, P2(x,y−2) 34, P2(x+1,y−2) 35 and P2(x+2,y−2) 36.

First patch signature 400 also includes as x-axis distance 431 and y-axis distance 431' that represent the distance of P1(x,y) from the closest anchor.

According to an embodiment of the disclosure the patch based inspection may use self-reconstruction. Self-reconstruction includes using similar patches of the same image. For example, in some cases, when the reference image is not available, a synthetic reference could be generated from the image itself by utilizing patch statistics collected from other image regions (other than the inspected candidate defect location).

According to an embodiment of the disclosure a synthetic reference could be constructed from a model image obtained from corresponding computer aided design (CAD) information. When used in this manner, the patch based inspection may benefit from having a reference which is defect clean, and from the ability to detect systematic defects that are otherwise undetectable (e.g. missing contact, consistent defects in generating some kind of pattern or sub-pattern). In addition, using the method of the current disclosure the necessity for accurate physical simulation during model generation is relaxed as the proposed method automatically learns the model-to-image mapping (during the synthetic reference generation).

The disclosure may be useful for images characterized by having, for various patches, many other similar patches. Experience show that the design of state-of-the art semiconductor devices give rise to images having this characterization.

According to an embodiment of the disclosure, a pre-processing operation is performed for evaluation of the above-described characterization. According to another embodiment of the disclosure, a size and shape of the patches is selected such that various patches of an image will have many other similar patches. The number of patches with many other similar patches, as well as a minimum number of similar patches, may be determined based on operation al needs and based on empirical findings.

The disclosure was described with reference to the use of two modalities—use of images acquired at two different imaging conditions, such as reflection and transmission imaging modes, or the acquired image and its self-reconstruction. It should be noted that the disclosure can be implemented by using three or more modalities. For example, reflection image, transmission image, self-reconstruction reflection image and model-reconstruction image may be used together.

According to an embodiment of the disclosure, the patch-based reconstruction is employed on three or more images, each indicative of a different modality. In this embodiment, each reference pixel is calculated as a function of values of pixels of those three or more images, each indicative of a different modality.

According to another embodiment of the disclosure, a set of two or more statistics of pairs of image patches is used to compute the expected value for the reference pixels, to thereby generate two or more reference images. For example, a reference image generated by employing a patch-base reconstruction of reflectance/transmittance images, and a reference image generated by employing a patch-base self-reconstruction of a reflectance image. According to this embodiment, a defect is detected if a defect signal above a specified threshold is discovered in both corresponding diff images.

In the foregoing specification, the disclosure has been described with reference to specific examples of embodiments of the disclosure. It will, however, be evident that various modifications and changes may be made therein without departing from the broader spirit and scope of the disclosure as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the disclosure described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein may be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations are merely illustrative. The multiple may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or operations then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to disclosures containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the disclosure have been illustrated and described herein, many modifications, substitutions, changes, and equivalents will now occur to those of ordinary skill in the art. It is, therefore, to be understood that the appended claims are intended to cover all such modifications and changes as fall within the true spirit of the disclosure.

We claim:

1. An inspection system, comprising:
 a memory to store a first image of an area of an object and a second image of the area of the object; and
 a processor operably coupled to the memory, wherein the processor is to:
  generate a synthetic image of the area of the object by repeating, for each first patch out of a group of first patches that belong to the first image, the operations of:
   (i) searching for relevant reference patches, wherein each relevant reference patch has a reference patch signature that is similar to a first patch signature of the first patch; and
   (ii) in response to detecting the relevant reference patches, processing the relevant reference patches to provide a synthetic patch of the synthetic image, wherein the synthetic image is generated such that a size of the synthetic image and a size of the first image are the same; and
  compare the synthetic image to the second image to provide defect detection results.

2. A method for inspecting an area of an object, the method comprises:
 generating, by a processor, a synthetic image of the area of the object, wherein generating the synthetic image comprises repeating, for each first patch out of a group of first patches that belong to a first image of the object, the operations of:
  (i) searching for relevant reference patches, wherein each relevant reference patch has a reference patch signature that is similar to a first patch signature of the first patch; and
  (ii) in response to detecting the relevant reference patches, processing the relevant reference patches to provide a synthetic patch of the synthetic image, wherein the synthetic image is generated such that a size of the synthetic image and a size of the first image are the same; and
 comparing the synthetic image to a second image of the object to provide defect detection results.

3. The method according to claim 2, wherein generating the synthetic image further comprising positioning the synthetic patch at a synthetic patch location that corresponds to a location of the first patch.

4. The method according to claim 3, wherein generating the synthetic image further comprises applying a smoothing function on partially overlapping synthetic patches.

5. The method according to claim 2, wherein generating the synthetic image further comprising receiving or generating information about regions of interest within the area of the object; and wherein the group of first patches includes only first patches that are at least partially included within a first region of interest of the regions of interest.

6. The method according to claim 5, wherein the object is a lithographic mask and wherein the regions of interest correspond to a printability of regions of the lithographic mask.

7. The method according to claim 2, wherein generating the synthetic image further comprises generating of the synthetic patch by calculating a weighted sum of the relevant reference patches.

8. The method according to claim 2, wherein the first patch signature comprises information about intensities of pixels of the first patch and information about intensities of pixels of a second image region; and wherein the second image region is located, within the second image, at a second image region location that that is proximate to a second image location that corresponds to a first location of the first patch.

9. The method according to claim 8, wherein the second image region surrounds second image pixels that are located, in the second image, at the second image location that corresponds to the first location of the first patch.

10. The method according to claim 8, comprising determining a similarity between the first patch signature and the reference patch signature based on a distance between the first patch signature and the reference patch signature.

11. The method according to claim 8, wherein the first patch signature further comprises spatial relationship information about a spatial relationship between the first patch and an anchor.

12. A non-transitory computer readable medium that stores instructions that once executed by a processing device cause the processing device to:

generate a synthetic image of an area of an object, wherein generating the synthetic image comprises repeating, for each first patch out of a group of first patches that belong to a first image of the object, the operations of:
   (i) searching for relevant reference patches, wherein each relevant reference patch has a reference patch signature that is similar to a first patch signature of the first patch; and
   (ii) in response to detecting the relevant reference patches, processing the relevant reference patches to provide a synthetic patch of the synthetic image, wherein the synthetic image is generated such that a size of the synthetic image and a size of the first image are the same; and compare the synthetic image to a second image of the object to provide defect detection results.

13. The non-transitory computer readable medium according to claim 12, wherein the instructions further cause the processing device to position the synthetic patch at a synthetic patch location that corresponds to a location of the first patch.

14. The non-transitory computer readable medium according to claim 13, wherein the instructions further cause the processing device to apply a smoothing function on partially overlapping synthetic patches.

* * * * *